Aug. 18, 1936.     H. C. HILKE     2,051,256
LOG TRISECTING STRUCTURE
Filed Oct. 10, 1933     3 Sheets-Sheet 1
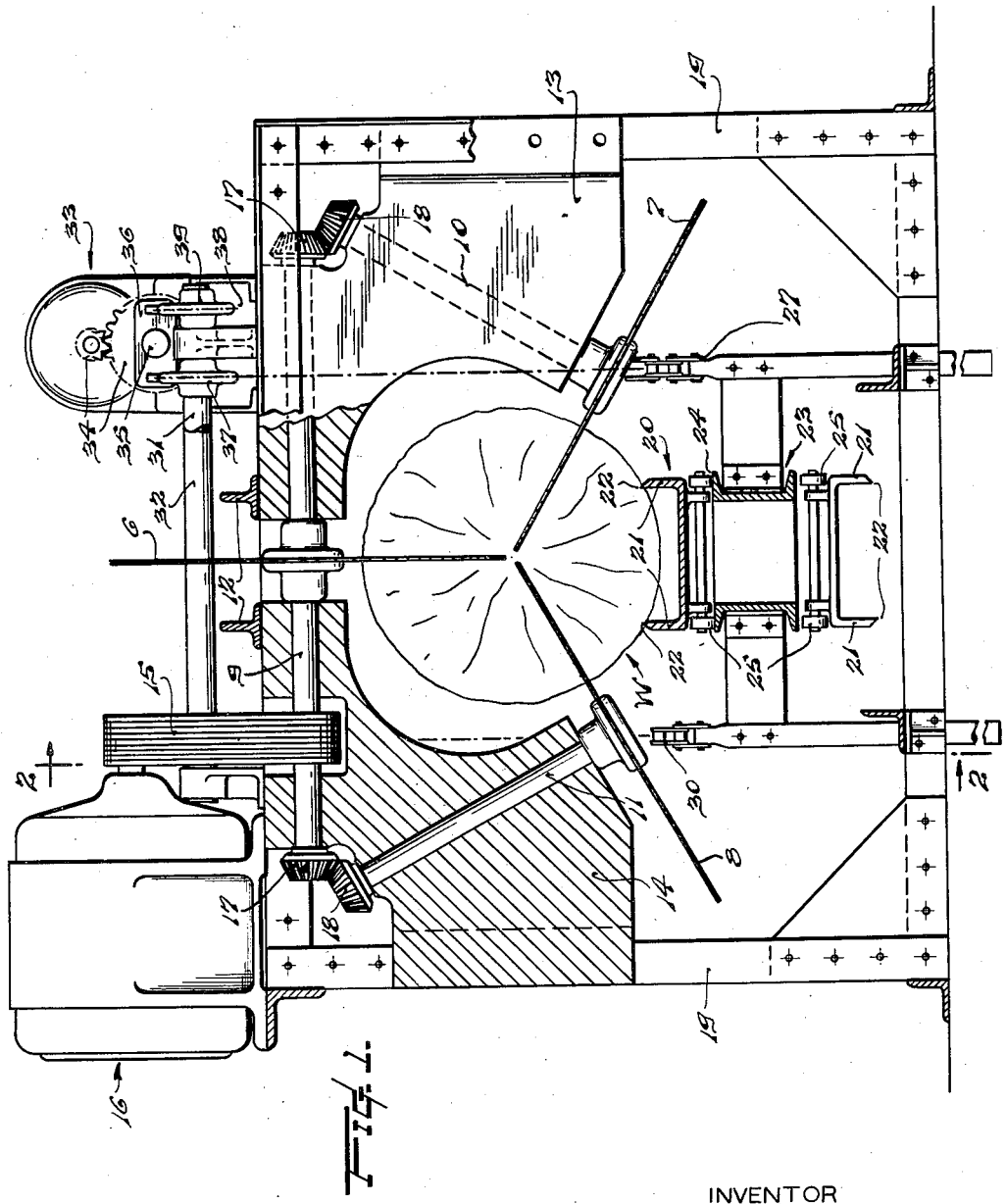
INVENTOR
Henry C. Hilke
BY
ATTORNEY

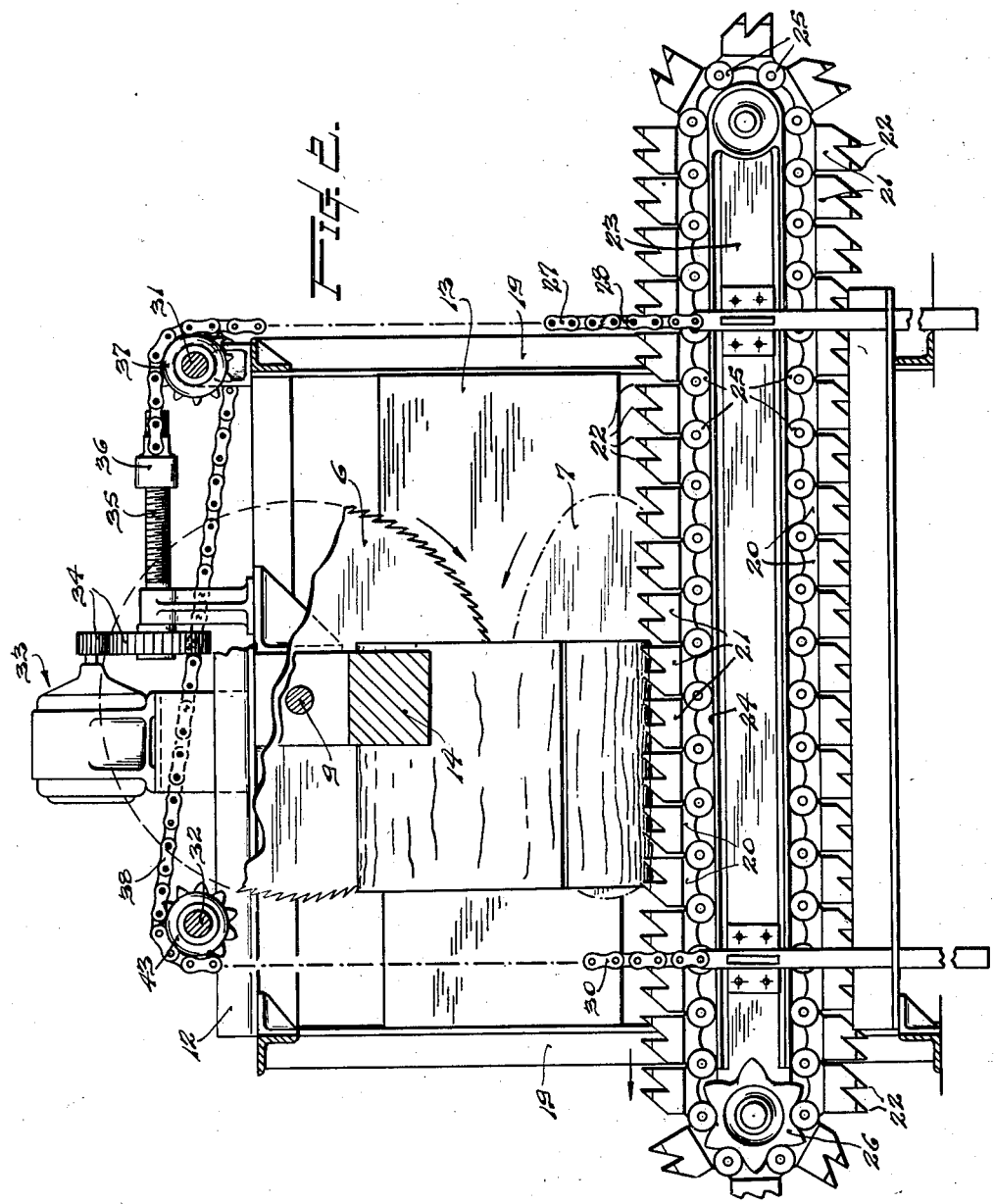

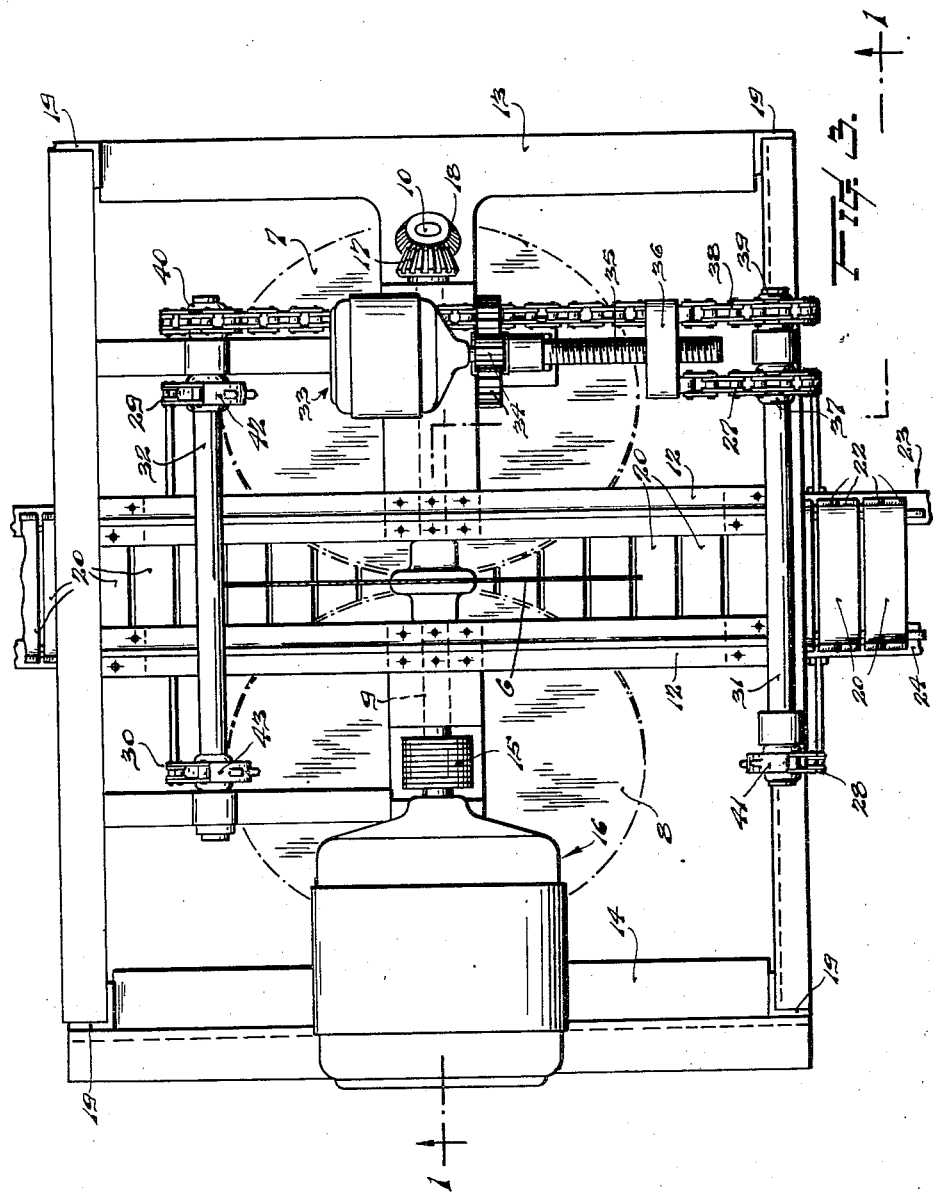

Patented Aug. 18, 1936

2,051,256

UNITED STATES PATENT OFFICE 2,051,256

LOG TRISECTING STRUCTURE

Henry C. Hilke, Seattle, Wash.

Application October 10, 1933, Serial No. 692,944

9 Claims. (Cl. 143—38)

This invention relates to saw structure the general object of which is to trisect logs, shingle blocks or the like to produce sectors from the same.

More specific objects and advantages of the invention will become apparent from the following detailed description and claims, the invention consisting in the novel method by which trisection of the log or shingle block is accomplished and in the construction, adaptation, and combination of parts hereinafter described and claimed.

In the drawings:—

Figure 1 is a transverse vertical section through structure constituting the now preferred embodiment of the invention, the section being taken on the line 1—1 of Fig. 3.

Fig. 2 is a longitudinal vertical section thereof taken on the line 2—2 of Fig. 1; and Fig. 3 is a top plan view.

In clarifying the invention, it is pointed out that an especial advantage achieved from the trisection of a log is the ability to produce vertical grain lumber or shingles, according as to whether logs or shingle blocks constitute the work. More especially, each produced sector being cut into lumber or shingles by running the saw cuts parallel as regards a substantial radial center line of the sector, each of said saw cuts cross a plurality of the wood grains. A further advantage is that a selective portion of a log may be removed as a sector, especially of import considering that not infrequently a material portion of a log, while suitable for shingles, is not suitable for lumber production. Trisection allows the operator to obtain from each log the maximum output of lumber by removing as a sector stock suitable for the production of high-grade lumber while removing as separate sectors the lower-grade lumber or shingle stock. Heretofore logs which may contain lower-grade stock in one side of the same have not infrequently been utilized entirely for shingle production.

As distinguished from the previous practice of quartering a shingle block to afford production of vertical grain shingles, said quartering being obtained by imparting a diametrical cut to the block and dividing the half-log slabs, the 90 degree angled configuration of the sectors thereby provided operates to produce, especially where the blocks are of relatively small diameters, an excessive quantity of narrow shingles. A further disadvantage of the quartering method comparatively with trisection is additional waste, it being understood that strips of wood of substantial diametrical configurations, said strips being termed spalts, are lost from both the leading and the following edges of the sectors as the same are being reduced to lumber or shingles. In clarifying, the quartering method produces one additional sector from which spalt waste is had.

Regarding the present invention, from a geometric view, three circular saws are used, such saws being disposed to have their planes of revolution intersect one another at angles of 120 degrees, a development of the axes thereof in accordance producing an equilateral triangle within the confines of which the log or the shingle block, as the case may be, is fed longitudinally. Such saws, moreover, are of a radius to each extend into proximity of but spaced from the point of intersection of their planes of movement, to produce, the work being located to dispose its center in axial alignment with the intersecting point of the saw planes, a center core in the work extending the length of the same. Such core operates to maintain the sectors of the trisected work from binding the saws during cutting activity.

Having particular reference to the drawings, the saws are represented by the numerals 6, 7, and 8, supporting shafts therefor being indicated by 9, 10, and 11, respectively. Said shafts are journaled in a pair of bearing blocks 13 and 14 which are spaced one from the other for the reception of the upper saw 6 therebetween, each of said bearing blocks being formed to a T-formation in top plan and rigidly secured by means of rails 12 and upright members 19 of an angle-iron frame. A drive to the shaft 9 comprises a chain 15 from a motor 16, bevel gears 17 at each end of the shaft 9 meshing bevel gears 18 on the shafts 10 and 11 to drive the latter.

It is to be noted that the present embodiment is designed primarily for the trisection of shingle blocks, as indicated at W. In supporting the same I provide an endless chain of interconnected links 20 which are formed to a substantial U- shape in the provision of laterally spaced apart arms 21 terminating at the outer extremities in rearwardly inclined dog tips 22, said dogs acting to penetrate the work with the inclinations of the same opposing the forces of dislodgement imparted from the saws to the work. A chassis for said chain carriage is represented at 23, a track 24 provided thereby receiving the rollers 25 of the chain links. 26 indicates a sprocket wheel drive for the chain driven from a motor (not shown). Shingle blocks are fed from a feed platform or as may otherwise be desired to the forward end of the chain carriage, regulating mechanism being provided for the latter in adjusting the same to various heights in conformity with the diameter of shingle block which is being handled.

Relative thereto, companion elevator chains 27, 28, and 29, 30 are connected with sliding guide arms at each end of the chassis 23 and are afforded collective movement from sprocket wheels keyed to overhead shafts 31 and 32. Said shafts, through the medium of a reversing motor 33, and gearing 34 to a worm 35 which acts in internal threads of a draw block 36, are rendered operative in raising or lowering the carriage. More particularly, engaging said draw block at opposite sides of the same are two chains, one of which, the chain 27, passes over a sprocket 27 for engagement with a guide arm of the chassis, and the other chain, indicated at 38, passing about a sprocket wheel 39 from which it passes below the draw block to a sprocket wheel 40 on the shaft 32, being secured to a lug thereon for rotating the shaft and its associated sprocket wheels 41, 42, which act to receive the chains 29, 30. Said sprocket wheels 37 and 39 co-act in rotating the shaft 31, a sprocket wheel 43 on which receives the elevator chain 28.

While representing elevating structure designed to trisect relatively short shingle blocks, the taper of which is negligible, it is believed obvious that in the trisection of logs, where the length of the same renders the taper material, the two ends of the log are elevated independently in positioning the center axially as regards the center of the saws.

The operation of the invention should be clear from the foregoing. The produced sectors which, in transverse section, constitute a trisection of the block are reduced to shingles by cutting the same on lines parallel with the substantial radial center line of the sector, the shingle cuts in no instance running tangent with the grain and the entire shingle output being accordingly vertical grain.

It is my intention to limit the invention only as by the scope of the hereto annexed claims.

What I claim, is:—

1. In saw structure for trisecting logs, in combination, a circular saw mounted for rotation in a vertical plane about a horizontal axis, a pair of circular saws located below said first-named saw and operating in conjunction therewith for movement about inclined axes intersecting one another and said first named axis at angles of 60 degrees to one another, a carriage for the work supported for movement below said saws on the longitudinal plane of the first-named saw, means to regulate the carriage vertically to locate the work centrally of the saws, and means for driving said carriage longitudinally to feed the work into cutting relation with the saws.

2. The structure as defined in claim 1, and a system of intermeshing bevel gears interconnecting said saws to provide a positive drive for operating the same at a uniform speed from a source of power common to each.

3. In log trisecting mechanism, the combination of three circular saws mounted to rotate about axes disposed at angles of 60 degrees to one another, the scope of the respective saws terminating in relative proximity of but spaced equidistantly from a point of intersection common to each of the saw planes, a horizontal carriage operative to support the work and feed the same through the space bounded by the lines of the saw axes, said carriage operating in a plane below said point of intersection of the saw planes, and means to regulate the height of the carriage to locate the center of the work axially with respect to said point of intersection of the saw planes.

4. In log trisecting mechanism, the combination of three circular saws mounted to rotate about axes disposed at angles of 60 degrees to one another, the scope of the respective saws terminating in relative proximity of but spaced equidistantly from a point of intersection common to each of the saw planes positive drive means for rotating said saws at a uniform speed, means operative to feed the work through the space bounded by the lines of the saw axes, and means to regulate the work to position the center of the same axially as regards the point of intersection of the saw planes.

5. In log trisecting mechanism, in combination, three circular saws mounted to locate their planes of movement in converging relations to one another at angles of 120 degrees, a vertically adjustable carriage located below the point of intersection of the saw planes for positioning the center of the work axially as regards the axial line of said intersecting planes, and means for operating said carriage longitudinally of said axial line for feeding the work into cutting relation with the saws.

6. In saw structure, in combination, a plurality of saws angularly arranged with respect to one another, the planes of movement of the same meeting on a common horizontally disposed axial line with the innermost cutting scope of the saws being in proximity to but spaced equidistantly from said line, a work-supporting carriage, located below the point of intersection of the saw planes in the space between two of the same, means to elevate and lower the carriage to position the center of the work supported thereby axially as regards said meeting line of the saw planes, and means for driving the carriage to feed the work into cutting relation with the saws.

7. In saw structure, in combination, a plurality of saws supported for rotation about horizontal axes and angularly arranged with respect to one another, the planes of movement of the same meeting on a common axial line, a carriage for the work including an endless chain and a supporting chassis therefor, means engaging the chassis at opposite sides of each of the two ends of the same for supporting the chassis, and means for simultaneously elevating or lowering said chassis-supporting means to position the center of the work thereon axially as regards said meeting line of the saw planes, and means for driving the chain to feed the work into cutting relation with the saws.

8. Structure for cutting a log into a plurality of sectors which comprises, in combination with a plurality of circular saws mounted in planes emanating from a common point and rotating about axes disposed at equidistant angles from one another, positive drive means for rotating said saws at a uniform speed, means operative to feed the work through the space bounded by the lines of the saw axes, and means to regulate the work to position the center of the same axially as regards the point of intersection of the saw planes.

9. Structure for cutting a log into a plurality of sectors which comprises, in combination with of a plurality of circular saws mounted to dispose their planes of movement at equidistant angles from one another and emanating from a point common to each of the planes, a vertically adjustable carriage located below the point of intersection common to said saw planes for positioning the center of the work axially as regards the axial line of said intersecting planes, and means for operating said carriage longitudinally of said axial line for feeding the work into cutting relation with the saws.

HENRY C. HILKE.